Figure 1:
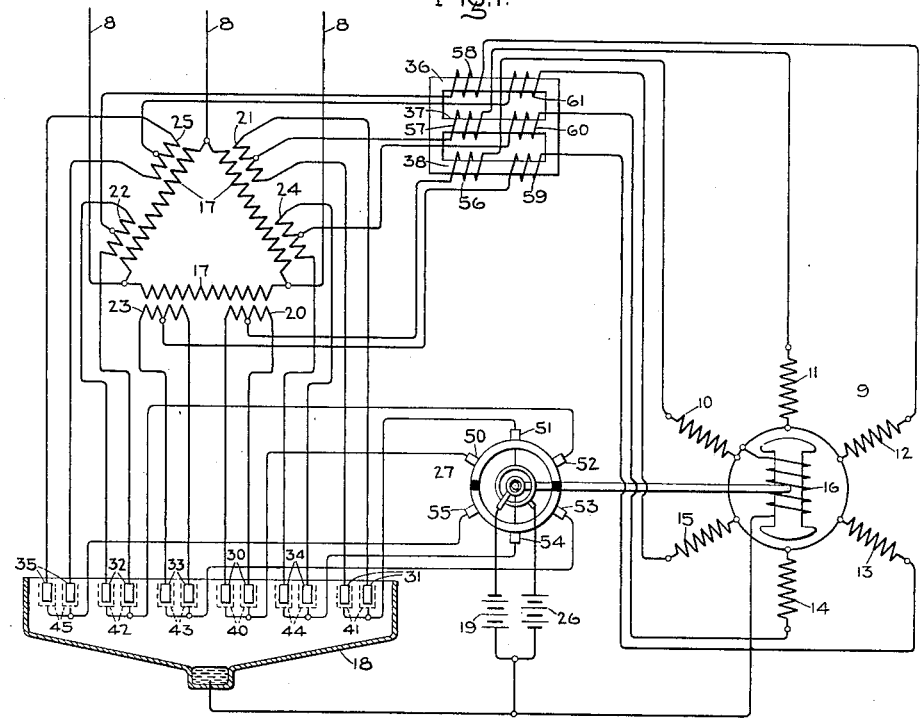

Sept. 11, 1934.  M. STÖHR  1,973,547

ELECTRIC VALVE CONVERTING SYSTEM

Filed June 27, 1933  2 Sheets-Sheet 1

Inventor:
Max Stöhr,
by Charles E. Tullar
His Attorney.

Sept. 11, 1934.  M. STÖHR  1,973,547

ELECTRIC VALVE CONVERTING SYSTEM

Filed June 27, 1933  2 Sheets-Sheet 2

Inventor:
Max Stöhr,
by Charles E. Mullan
His Attorney.

Patented Sept. 11, 1934

1,973,547

UNITED STATES PATENT OFFICE 1,973,547

ELECTRIC VALVE CONVERTING SYSTEM

Max Stöhr, Berlin-Tegel, Germany, assignor to General Electric Company, a corporation of New York Application June 27, 1933, Serial No. 677,919
In Germany August 24, 1932

11 Claims. (Cl. 172—120)

My invention relates to electric valve converting systems and more particularly to such systems suitable for transmitting energy from an alternating current supply circuit to an alternating current load circuit or alternating current motor asynchronous with respect to the supply circuit.

Heretofore there have been devised numerous electric valve converting systems for transmitting energy between direct and alternating current circuits, direct current circuits of different voltages, or asynchronous alternating current circuits of the same or different frequencies. In the majority of these arrangements, the load circuit has included a plurality of phase windings which constitute either the active windings of a load device or the primary windings of an output transformer. These windings have been connected for either full wave operation or for half wave operation, in which case they are connected in star and the electrical neutral forms one connection to the supply circuit. In the majority of the arrangements of the prior art current flows through only one path of the inductive network comprising the phase windings, that is, a single phase winding in case of half wave operation, or two serially connected phase windings, in case of full wave operation. This is due to the fact that if two parallel electric valve paths interconnect a supply circuit and a load circuit, current will only flow in that path in which the supply electromotive force is the higher, or the counter-electromotive force of the load is the lower, as the difference in voltage between the two paths is effective to interrupt the current in one of the electric valves. Such conditions of operation result in a very low utility of the phase windings of the load circuit, it being desirable that current flow in a plurality of the phase windings simultaneously, these currents being displaced in phase as in an ordinary polyphase circuit.

It is an object of my invention, therefore, to provide a new and improved electric valve converting system which will overcome the above-mentioned disadvantages of the arrangements of the prior art and which will be simple and reliable in operation.

It is another object of my invention to provide an improved electric valve converting system for transmitting energy from an alternating current supply circuit to an alternating current load circuit or alternating current motor, in which current will flow simultaneously through a plurality of paths of the load circuit to increase the utility factor of the output circuit of the converting system.

In accordance with my invention, an alternating current supply circuit is connected to supply energy to an alternating current load circuit, or device, asynchronous with respect to the supply circuit, through a plurality of electric valve paths. These valve paths may comprise a multiple anode, single cathode, electric discharge device or a plurality of single anode, single cathode, devices, as is well understood by those skilled in the art. A plurality of inductive windings are included in the connections between the supply circuit and the phase windings of the load circuit and are so connected as to force current to flow simultaneously in a plurality of the valve paths and thus through a plurality of the phase windings of the load circuit to increase the utility factor thereof. These inductive windings may comprise a plurality of current equalizing devices provided with inductive windings included in the connections to a plurality of the phase windings of the load circuit and effective to force current to flow in a phase winding associated with an inductive winding of each of the reactance devices. In accordance with a modification of the invention, the inductive windings comprise an isolated neutral star-connected supply transformer, the several phase windings of the load circuit being supplied from separate phases of the supply circuit through the electric valve paths. With such a connection, current can flow between two of the supply lines only by passing through a plurality of the supply phases in series, thus forcing equal currents to flow in a corresponding number of the load phase windings.

Figure 2:
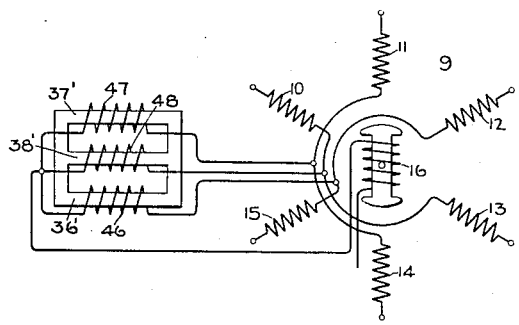
Figure 3:
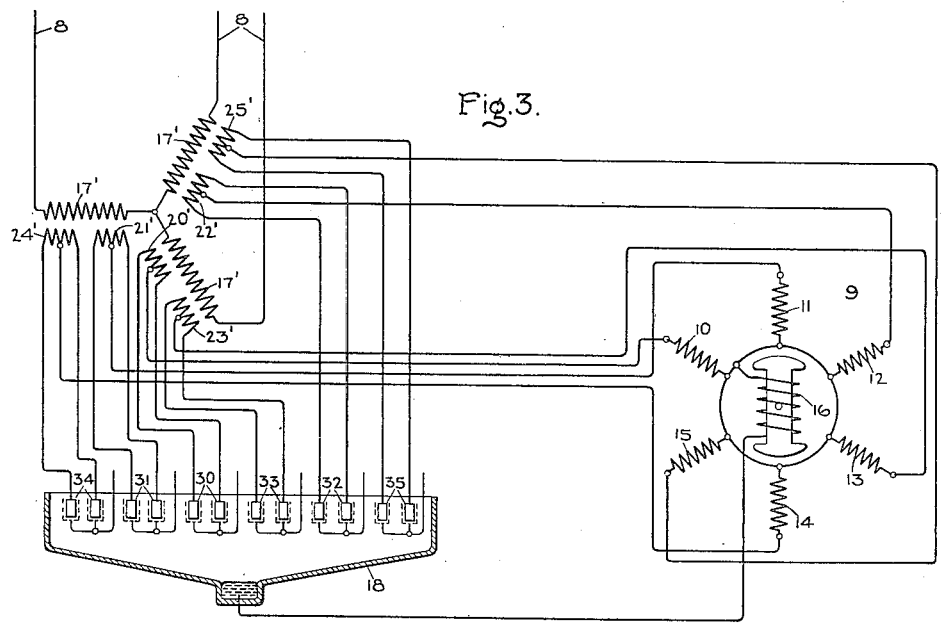
Figure 4:
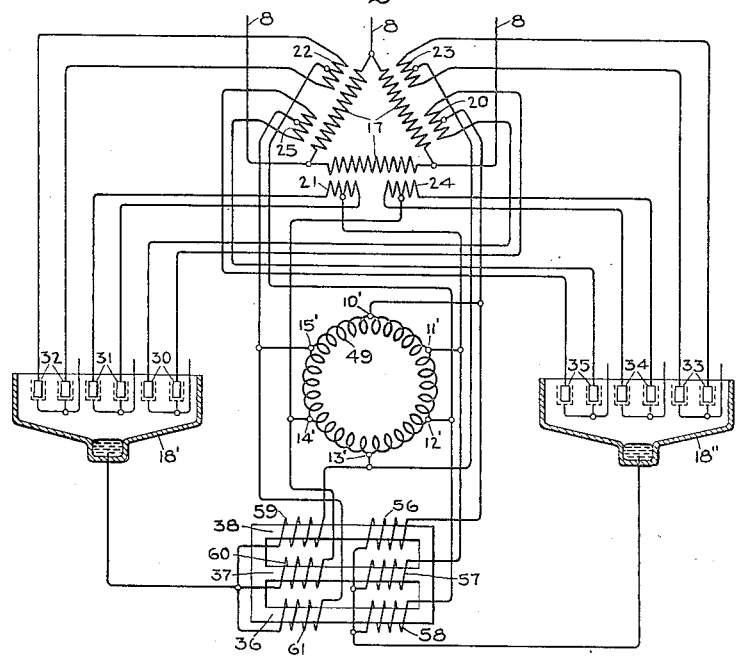

For a better understanding of my invention, together with other and further objects thereof, reference is had to the following description taken in connection with the accompanying drawings, and its scope will be pointed out in the appended claims. Referring to the drawings, Fig. 1 diagrammatically illustrates an electric valve converting system embodying my invention for transmitting energy from a three-phase alternating current supply circuit to a six-phase variable speed alternating current motor connected for half wave operation. Fig. 2 shows a modified circuit connection for introducing constant current reactance devices into the system; Fig. 3 represents a further modification of my invention utilizing an isolated neutral star-connected supply transformer, while Fig. 4 illustrates my invention as applied to a six-phase mesh connected load circuit.

Referring now more particularly to Fig. 1 of the drawings, there is shown an electric valve converting system for transmitting energy from a three-phase alternating current supply circuit 8 to a six-phase half wave alternating current motor 9 comprising the phase windings 10-15, inc., and a rotatable field winding 16, one terminal of which is connected to the electrical neutral of the armature phase windings. The several phase windings 10-15, inc., are energized from secondary windings 20-25, inc., respectively, of a transformer network, the primary windings 17 of which are connected to the supply circuit 8. Each of the phase windings 10-15, inc., is energized from its respective secondary winding 20-25, inc., through a pair of electric valves or valve paths which may be of any of the several types well known in the art, although I have illustrated them as comprising a single vapor electric discharge device 18 provided with a plurality of pairs of anodes 30-35, inc., connected with their associated secondary windings 20-25, inc., in a conventional manner to supply full wave rectified current to the several phase windings 10-15, inc. The several rectifiers have a common connection from the cathode of the device 18 to the other terminal of the rotatable field winding 16. Such a connection gives the motor 9 series characteristics. However, it will be understood that, in case shunt characteristics are desired, the winding 16 may be omitted from this common connection and excited from any suitable source.

In order to excite the several phase windings 10-15, inc., in proper sequence, the several pairs of anodes 30-35, inc., are provided with associated control grids 40-45, inc., respectively, which are connected to be charged alternately negative and positive by means of the bias batteries 19 and 26, respectively, through brushes 50-55, inc., of a distributor 27 driven by the rotating member 16 of the motor 9. As illustrated, the connections are such that the grids connected to three of the brushes of the distributor 27 are simultaneously charged positively to render their associated anodes conductive, while the grids connected to the other three brushes are simultaneously charged negatively to maintain their associated anodes nonconductive.

As stated above, with such an arrangement, not more than one of the secondary windings 20-25, inc., together with its associated anodes, would normally be effective to conduct current at any given instant to its associated phase winding of the motor 9, since at any given instant the electromotive force of one of the secondary windings 20-25, inc., will exceed the counter-electromotive force of its associated phase winding by an amount greater than any other winding. This secondary winding, in addition to supplying current to its own phase winding, will tend to send a reverse current through that secondary winding having a lower electromotive force resulting in an extinction of the current in its associated valve paths.

In order to maintain the current simultaneously in a plurality of the phase windings 10-15, inc., there are provided current equalizing devices 36, 37 and 38, which may have separate magnetic core structures, or which may comprise a single three-legged magnetic core structure, as illustrated. The reactance devices 36, 37 and 38 include inductive windings 56-61, inc., two windings being mounted on the core of each device and being included in the connections to diametrically oppose phase windings of the motor 9.

The general principles of operation of the above described apparatus will be well understood by those skilled in the art. In brief, if it be assumed that the apparatus is in substantially the position illustrated, the grids 43, 44 and 45 associated with the pairs of anodes 33, 34 and 35, will be charged negatively through the brushes 53, 54 and 55, respectively, of the distributor mechanism 27 from the negative bias battery 19, so that these anodes will be maintained non-conductive and the corresponding phase windings 13, 14 and 15 will be deenergized. At the same time, the grids 40, 41 and 42 associated with the anodes 30, 31 and 32 will be charged positively from the positive bias battery 26 through the brushes 50, 51 and 52, respectively, of the distributor mechanism 27 to render their associated anodes conductive. These pairs of anodes, together with their associated transformer secondary windings 20, 21 and 22, will supply unidirectional current to the phase windings 10, 11 and 12.

As stated above, in the arrangements of the prior art, such a control of the several electric valve paths would be effective to energize only one of the phase windings 10, 11 or 12 from their associated rectifier circuits, depending upon which of these circuits at the particular instant had the greater difference between the applied electromotive force derived from the transformer secondary windings, and the counter-electromotive force developed by the rotation of the field member 16 in the windings 10, 11 or 12. The effect of the reactance devices 36, 37 and 38, however, is to tend to maintain equal magnetomotive forces in the windings of the devices, and since the electric valve path in the circuit of only one winding of each device is conductive at any given instant, the current in this winding will be maintained substantially constant for a full 180 electrical degrees, as referred to the load circuit. Under these conditions, substantially equal unidirectional currents flow in the windings 10, 11 and 12 and a torque is produced upon the rotatable field member 16 to initiate rotation of the motor. After the field member 16 has rotated through substantially 30 electrical degrees, as referred to the position illustrated in the drawing, the grids 40 associated with the anodes 30 will receive a negative charge from the battery 19 through the brush 50, while the grids 43 associated with the anodes 33 will receive a positive charge from the battery 26 through the brush 53; that is, the anodes 30 become non-conductive at substantially the same instant that the anodes 33 become conductive and the reactance device 38 is effective to transfer substantially the constant unidirectional current from the circuit including the winding 56 to the circuit including the winding 59, that is, to the circuit including the phase winding 13. As the phase winding 10 is deenergized and the phase winding 13 is energized, the resultant magnetomotive force of the motor 9 is advanced through 60 electrical degrees to produce further rotation of the motor. In this manner the current is successively transferred or commutated between the several phase windings of the motor 9 to produce rotation of the motor. With the field winding 16 connected in series with the resultant unidirectional current supplied to the several conductive phase windings, the motor 9 will accelerate to a speed dependent upon its connected load and will have speed-torque characteristics similar to those of a direct current series motor. Obviously, if the field winding 16 is separately excited as suggested above, the characteristics will be those of a shunt motor. With the operation just described, it is seen that three of the phase windings of the motor 9 are at all times simultaneously conductive, the current being forced to flow through their associated valve paths by means of the current equalizing devices 36, 37 and 38.

Fig. 2 illustrates a modified circuit arrangement in which the constant current reactance devices 36', 37' and 38', replace the devices 36, 37 and 38 of the system of Fig. 1. In this modification each of the devices is provided with a single one of the inductive windings 46, 47 or 48, corresponding terminals of which are connected to independent neutrals of diametrically opposed phase windings of the motor 9, while the other terminals of the inductive windings are connected to form a common circuit including the field member 16 of the motor 9. The operation of the system with this modified circuit is substantially identical to that described above. Each of the devices 36', 37' and 38' maintains constant the total of the currents in the two diametrically opposed phase windings of the motor 9 to which it is connected and, since the valve paths associated with only one of the phase windings are conductive at any given instant, substantially constant current is maintained in that particular winding for substantially 180 electrical degrees, as referred to the load circuit, thus maintaining current simultaneously in three of the phase windings, as in the arrangement described above.

In the circuit arrangement shown in Fig. 3 the transformer of Fig. 1 comprising the primary windings 17 and the secondary windings 20–25, inclusive, is replaced by a transformer network comprising star-connected, isolated neutral, primary windings 17' connected to the supply circuit 8, and secondary windings 20'–25' inclusive, connected similarly to the secondary windings 20–25 of the arrangement of Fig. 1. With such an arrangement, any current flowing between two lines of the supply circuit 8 must flow through at least two of the primary windings 17' in series, so that equal currents must flow in at least two of the associated secondary windings 20'–25', inclusive. For example, if, at a particular instant, current is flowing from the left-hand supply line 8 through the left-hand primary winding 17' in series with the upper primary winding 17' to the intermediate supply line 8, current must flow at the same time in one of the windings 21' or 24' and in one of the windings 22' or 25'. If it be assumed that the valve paths associated with the windings 21' and 22' are at the particular instant conductive, these windings with their associated valve paths will supply unidirectional current to the phase windings 11 and 12. The grid circuit is similar to that of Fig. 1 with the exception that the segment connected to the positive bias battery need be only 120 electrical degrees, while the segment connected to the negative bias battery is 240 electrical degrees, rather than 180 electrical degrees each, as in the arrangement of Fig. 1. With such an arrangement, two adjacent phase windings of the motor 9 are at all times energized and the current is commutated between the successive phase windings, as in the arrangement of Fig. 1.

In Fig. 4 is shown a modification of the circuit of Fig. 1 for full wave operation of a load circuit comprising an inductive network 49 provided with the phase terminals 10'–15', corresponding to the phase windings 10–15 of the arrangement of Fig. 1. In this case the electric discharge device 18 of Fig. 1 is replaced by two electric discharge devices, the device 18' containing the anodes 30, 31 and 32 and the device 18'' containing the anodes 33, 34 and 35. The connections of the cathodes of the devices 18' and 18'', rather than being made to the electrical neutral of the network 49, are made to the phase terminals 10'–15' through the inductive windings 56–61 of the reactance devices 36, 37 and 38, the connections of the cathode of each of the discharge devices 18' and 18'' being made through its associated inductive windings to phase terminals diametrically opposed to the phase terminals connected to the secondary windings 20–25, inclusive, associated with the anodes of the particular discharge device. In this manner, each of the secondary windings, together with its associated anodes, acts as a full wave rectifier, of which the load circuit comprises one of the inductive windings 56–61, inclusive, and diametrically opposed phase terminals of the network 49. For example, the secondary winding 20, together with its associated anodes 30, constitutes a full wave rectifier of which the load circuit comprises inductive winding 59 of reactance device 38 and the phase terminals 13' and 10' of the network 49. The grids associated with the several anodes of the discharge devices 18' and 18'' are controlled in a manner similar to that of Fig. 1, three pairs of anodes being simultaneously conductive at any given instant and the operation is similar to that described in connection with Fig. 1.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve converting system comprising an alternating current supply circuit, an alternating current load circuit asynchronous with respect to said supply circuit, said load circuit comprising a plurality of phase terminals, a plurality of inductive windings, an electric valve means for each of said phase terminals and connected to transmit current from said supply circuit to its associated phase terminal through one of said inductive windings, and means for sequentially rendering said electric valve means conductive in groups of at least two, said inductive windings being connected to force current to flow simultaneously in all of said valve means of a group.

2. An electric valve converting system comprising an alternating current supply circuit, an alternating current load circuit asynchronous with respect to said supply circuit and comprising a polyphase network provided with a plurality of phase terminals, an electric valve means for each of said terminals and connected to transmit energy thereto from said source, means for sequentially rendering said electric valve means conductive in groups, and a plurality of current equalizing devices, each included in the connections of a plurality of phase terminals to group said phase terminals, whereby current is forced to flow in an electric valve means associated with a phase terminal of each of the groups.

3. An electric valve converting system comprising an alternating current supply circuit, an alternating current load circuit asynchronous with respect to said supply circuit, said load circuit comprising a plurality of phase windings, an electric valve means for each of said phase windings and connected to transmit energy from said supply circuit to its associated phase winding, means for sequentially rendering said electric valve means conductive in groups, and a plurality of current equalizing devices each included in the connections of a plurality of said phase windings to group said phase windings, whereby current is forced to flow in an electric valve means associated with a phase winding of each of the groups.

4. An electric valve converting system comprising an alternating current supply circuit, an alternating current load circuit asynchronous with respect to said supply circuit, said load circuit comprising a plurality of phase windings, an electric valve means for each of said phase windings and connected to transmit energy from said supply circuit to its associated phase winding, means for sequentially rendering said electric valve means conductive in groups, and a plurality of current equalizing devices, each provided with a plurality of windings and each winding being included in the connection of one of said phase windings, whereby current is forced to flow in an electric valve means associated with one of the phase windings in circuit with each of said equalizing devices.

5. An electric valve converting system comprising an alternating current supply circuit, a polyphase alternating current load circuit asynchronous with respect to said supply circuit, said load circuit comprising $n$ phase windings, $n$ electric valve means, each connected to transmit energy from said source to one of said phase windings, means for sequentially rendering said electric valve means conductive in groups of $n/2$, and $n/2$ current equalizing devices, each provided with a pair of windings and said windings being included in the connections to a pair of said phase windings in phase opposition, whereby $n/2$ of said valve means are forced to conduct simultaneously and enegrize their respective phase windings.

6. An electric valve converting system comprising an alternating current supply circuit, an alternating current load circuit asynchronous with respect to said supply circuit and comprising a polyphase network provided with a plurality of phase terminals, a transformer provided with a primary winding connected to said supply circuit and with a plurality of secondary windings, a pair of electric valves for each of said secondary windings, and connected therewith to form a rectifier with its unidirectional circuit connected to phase displaced phase terminals of said network, means for sequentially rendering said pairs of electric valves conductive in groups, and a plurality of current equalizing devices, each provided with a plurality of windings, included in the connections to symmetrically spaced phase terminals, whereby current is forced to flow in an electric valve of a pair associated with a winding of each of said equalizing devices.

7. An electric valve converting system comprising an alternating current supply circuit, an alternating current load circuit asynchronous with respect to said supply circuit and comprising a plurality of phase windings connected in star, a transformer provided with a primary winding connected to said supply circuit and with a plurality of secondary windings each provided with an electrical neutral connected to one of said phase windings, a plurality of electric valves interconnecting the terminals of said secondary windings and the electrical neutral of said star connected windings, means for sequentially rendering said valves conductive in groups, and a plurality of current equalizing devices each included in the connections to said phase windings opposite in phase.

8. An electric valve converting system comprising an alternating current supply circuit, an alternating current load circuit asynchronous with respect to said supply circuit and comprising a plurality of phase windings connected in a ring network provided with a plurality of phase terminals, a transformer provided with a primary winding connected to said supply circuit and with a plurality of secondary windings each provided with an electrical neutral connected to one of said phase terminals, a pair of electric valves interconnecting the terminals of each secondary winding to a phase terminal of said network in phase opposition to the terminal connected to the neutral of the same secondary winding, means for sequentially rendering said valves conductive in groups, and a plurality of current equalizing devices each provided with a plurality of windings included in the connections to symmetrically spaced phase terminals, whereby current is forced to flow in an electric valve associated with a winding of each of said equalizing devices.

9. An electric valve converting system comprising a polyphase alternating current supply circuit, a polyphase alternating current load circuit asynchronous with respect to said supply circuit, said load circuit comprising a polyphase network provided with a plurality of phase terminals, a transformer provided with isolated neutral star-connected primary windings connected to said supply circuit and with secondary windings, an electric valve means for each of said phase terminals and connected to supply current to its phase terminal from a secondary winding of only one phase of said transformer, and means for rendering said valve means conductive in a predetermined sequence, whereby two of said valve means are forced to conduct current simultaneously to their associated phase terminals.

10. An electric valve converting system comprising an $m$-phase polyphase alternating current supply circuit, a polyphase alternating current load circuit asynchronous with respect to said supply circuit and comprising $n$ phase windings, an isolated neutral star-connected transformer provided with primary windings connected to said supply circuit and with $n/m$ secondary windings per phase, $n$ electric valve means, each connected to energize a phase winding of said load circuit from only one of said secondary windings, and means for rendering said valves conductive in a predetermined sequence whereby two of said valve means are forced to conduct current simultaneously to their associated phase windings.

11. In combination a polyphase dynamo-electric machine provided with a plurality of phase windings, a plurality of inductive windings, an electric valve means connected to control the energization of each of said phase windings through one of said inductive windings, and means for sequentially rendering said electric valve means conductive in groups, said inductive windings being connected to force current to flow simultaneously in all of said valve means of a group.

MAX STÖHR.